(12) United States Patent
Buchheit

(10) Patent No.: US 9,582,945 B2
(45) Date of Patent: Feb. 28, 2017

(54) RIGGING METHODS TO CALIBRATE CONTROL BODIES OF VEHICLES, AND RELATED SYSTEMS

(71) Applicant: THE BOEING COMPANY, Chicago, IL (US)

(72) Inventor: Jack G. Buchheit, Kirkwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 329 days.

(21) Appl. No.: 14/289,314

(22) Filed: May 28, 2014

(65) Prior Publication Data

US 2016/0202148 A1 Jul. 14, 2016

(51) Int. Cl.
*G01M 17/00* (2006.01)
*G07C 5/08* (2006.01)
*B64F 5/00* (2006.01)

(52) U.S. Cl.
CPC .......... *G07C 5/0808* (2013.01); *B64F 5/0045* (2013.01)

(58) Field of Classification Search
USPC ................ 73/117.01, 117.02, 118.01, 118.03
See application file for complete search history.

(56) References Cited

U.S. PATENT DOCUMENTS

| | | | | |
|---|---|---|---|---|
| 8,983,794 B1 * | 3/2015 | Motzer | ................... | G01B 17/06 702/150 |
| 2007/0127015 A1 * | 6/2007 | Palmateer | .............. | G01B 11/25 356/237.1 |
| 2009/0106988 A1 * | 4/2009 | Cobb | .................... | B64F 5/0009 33/1 BB |
| 2009/0112349 A1 * | 4/2009 | Cobb | .................... | B64F 5/0009 700/114 |
| 2009/0152391 A1 * | 6/2009 | McWhirk | ................. | B64B 1/02 244/30 |
| 2015/0316649 A1 * | 11/2015 | Marsh | ..................... | G01S 17/88 356/4.01 |
| 2016/0173962 A1 * | 6/2016 | Vance | ................... | H04W 84/18 340/870.02 |

* cited by examiner

*Primary Examiner* — Eric S McCall
(74) *Attorney, Agent, or Firm* — Patterson + Sheridan, LLP

(57) ABSTRACT

Rigging methods to calibrate control surfaces, and related systems are disclosed. A rotatable control body may steer a vehicle. Deviations of the control body shape may distort a relationship between vehicle controls and the control body. Calibration restores the relationship by establishing an alignment surface as part of the control body which may be aligned to a rigging point on the vehicle associated with a known control setting. A metrology device and/or computer software may be used for calibration. The metrology device may define a positional relationship between a reference surface, a rotational axis, and a target location of the alignment surface. By manipulating a surface of the control body to a target relationship relative to the reference surface, the location of the alignment surface may be achieved relative to the control body. In this manner, a rigging feature with the alignment surface may be formed to improve vehicle performance.

19 Claims, 10 Drawing Sheets

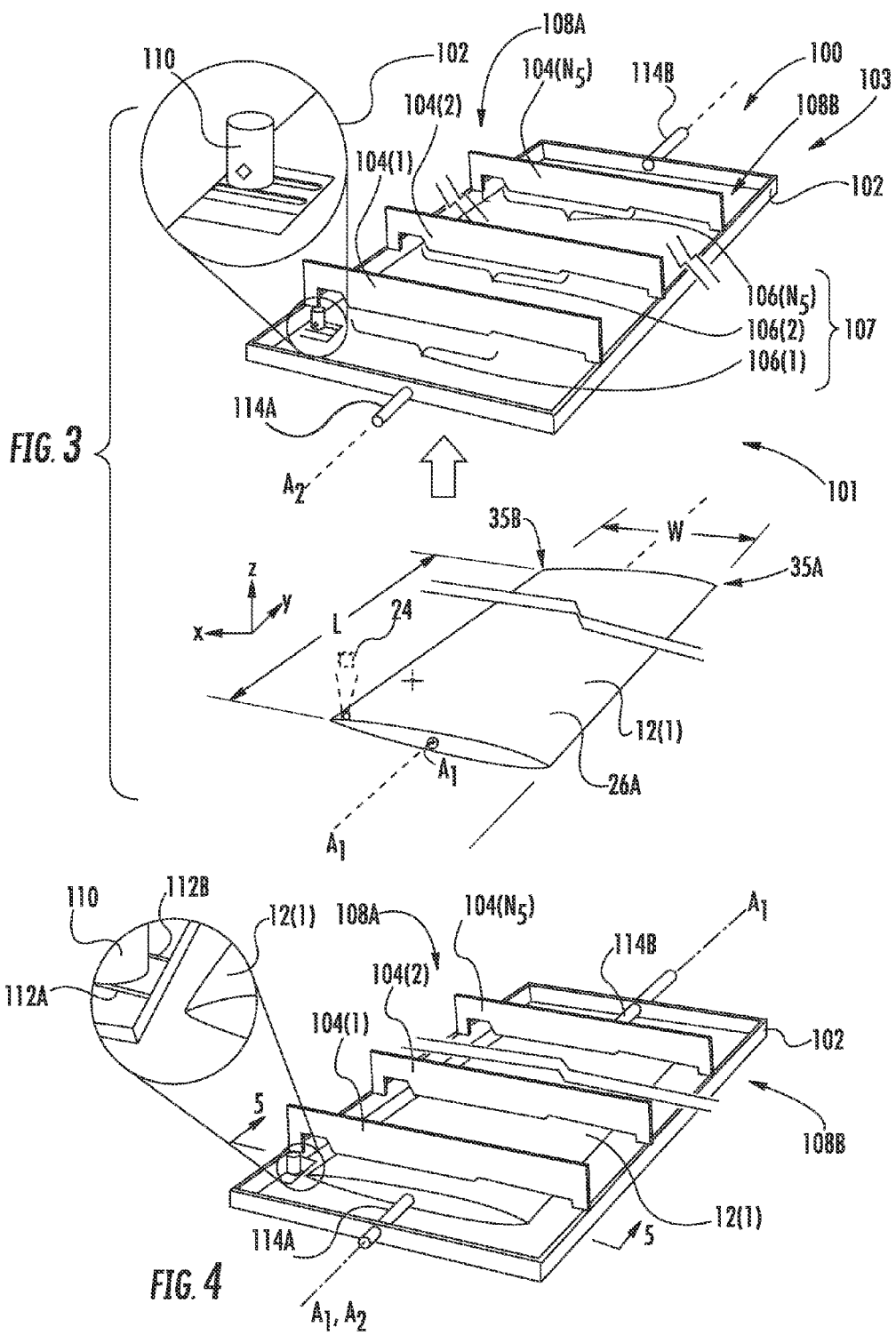

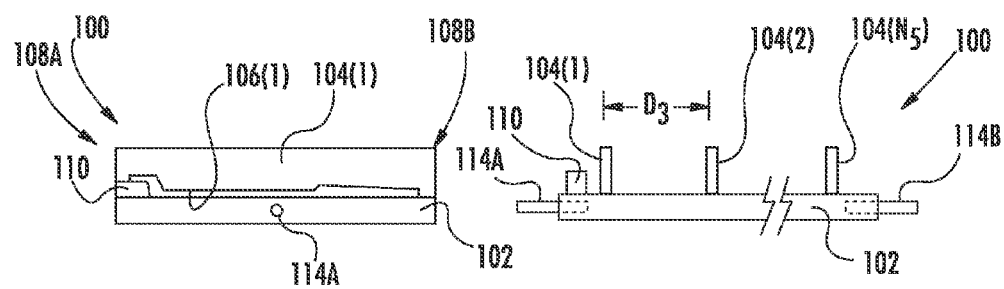
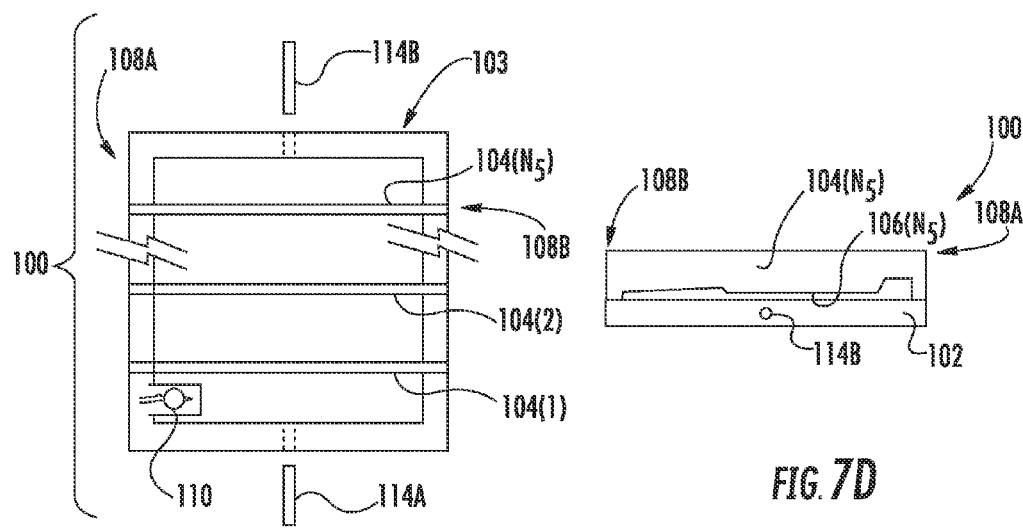

RIGGING METHODS TO CALIBRATE CONTROL BODIES OF VEHICLES, AND RELATED SYSTEMS

BACKGROUND

Field of Disclosure

The present disclosure relates to calibrating steering devices to vehicle operator controls, and more specifically, to rigging fluid control bodies to vehicle operator controls.

Technical Background

Fluid dynamics includes the disciplines of aerodynamics and hydrodynamics to optimize fluid flow across control surfaces of a vehicle. The control surfaces are precisely moved by the operator during vehicle movement to create steering forces to direct the vehicle in a designated path and provide stability during travel. For example, a rudder may be adjusted to steer a watercraft or an elevator of a wing may be positioned to stabilize lift forces. Complex three-dimensional shapes are often used as control surfaces to optimize fuel consumption and provide effective operation. These shapes in combination with the other surfaces determine vehicle performance characteristics.

SUMMARY

In one embodiment, a rigging method is disclosed. The rigging method includes positioning a control surface of a control body of a vehicle into a facing relationship with a reference surface defined by a metrology device. The rigging method also includes manipulating the control body and the metrology device relative to each other until a target relationship is achieved between the reference surface and a control surface of the control body. The rigging method also includes determining a location for a rigging feature on the control body while maintaining the target relationship. In this manner, vehicle performance may be optimized when the control body is assembled to a vehicle.

In another embodiment, a metrology device is disclosed. The metrology device includes a reference structure. The reference structure includes a plurality of contour elements comprising a plurality of reference component surfaces. Each of the plurality of contour elements includes a first side and a second side opposite the first side. The reference structure also includes a frame attached to the first side and the second side of each of the plurality of contour elements. The frame defines a positional relationship between the plurality of contour elements to collectively define a reference surface from the plurality of reference component surfaces. The reference surface is associated with a nominal surface of a control body. The metrology device also includes a material removal device disposed with respect to the reference structure and configured to dispose an alignment surface of a rigging feature of the control body with respect to the reference structure. In this manner, a vehicle with the control surface may perform more predictably to specification.

In another embodiment, a computer program product for rigging a control surface is disclosed. The computer program product including a computer-readable storage medium having computer-readable program code embodied therewith. The computer-readable program code including computer-readable program code configured to measure, by instructing at least one metrology device, topology data of a control surface of the control body relative to a pivot point of the control surface. The computer-readable program code also includes computer-readable program code configured to determine deviations of the control surface measured with respect to a reference surface. The computer-readable program code also includes computer-readable program code configured to calculate an angular position of the control body relative to a pivot point of the control body which minimizes a variance of the deviations. The computer-readable program code also includes computer-readable program code configured to calculate at least one of a dimension of a rigging feature and an attachment location of the rigging feature with respect to the control body, so that an alignment surface of the rigging feature is aligned to a predetermined location of a rigging point on a vehicle upon rotatable assembly of the control body to the vehicle. In this manner, the operator controls may be calibrated efficiently to the control surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF ILLUSTRATIONS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a top perspective view of a control surface of the control body of FIG. 1C being positioned into a facing relationship with an exemplary metrology device, and a close-up view of an exemplary material removal device included as part of the metrology device;

Figure 1A:
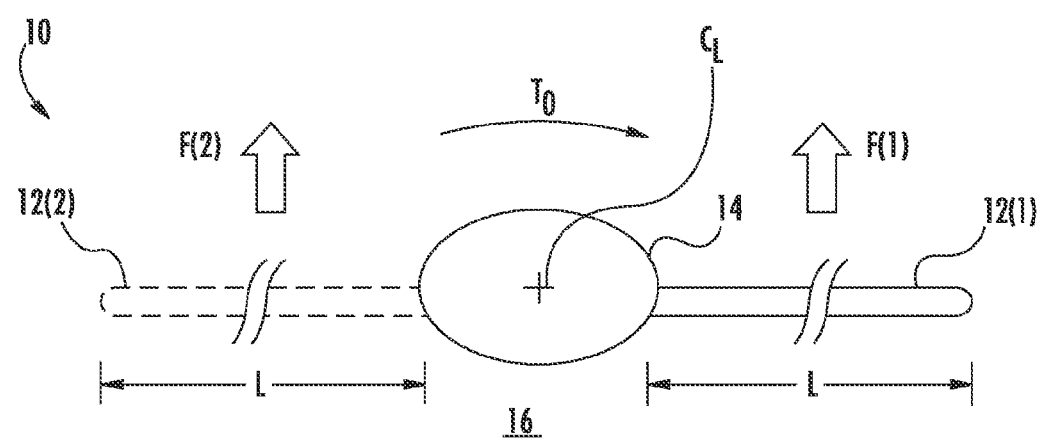
FIG. 1A is a axial view of a vehicle traveling in a fluid at a design condition with stability and predictable performance, and the vehicle includes an element and at least one control body.
Figure 1B:
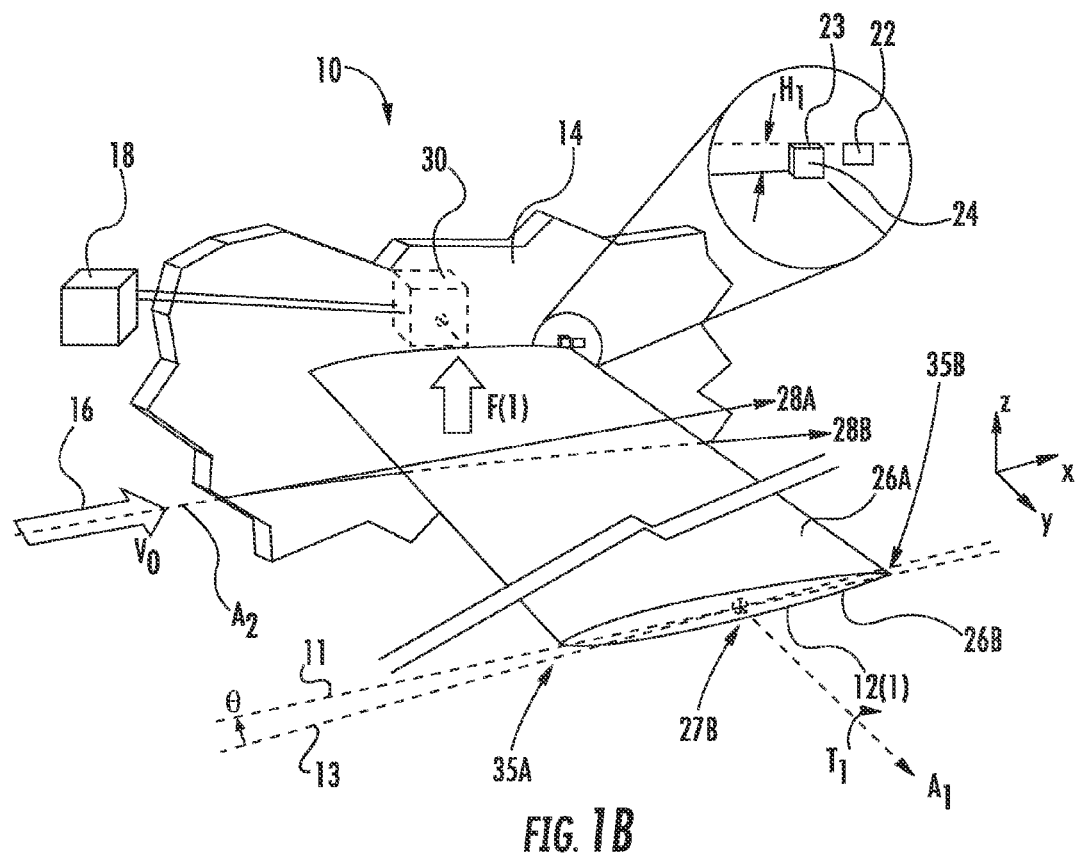
FIG. 1B is a partial top perspective view from a tip of one of the at least one control body of the vehicle of FIG. 1A rotatable from the element, the control body includes a rigging feature aligned with a rigging point attached to the element, the alignment indicating the control body is at an angular position theta associated with the design condition.
Figure 5:
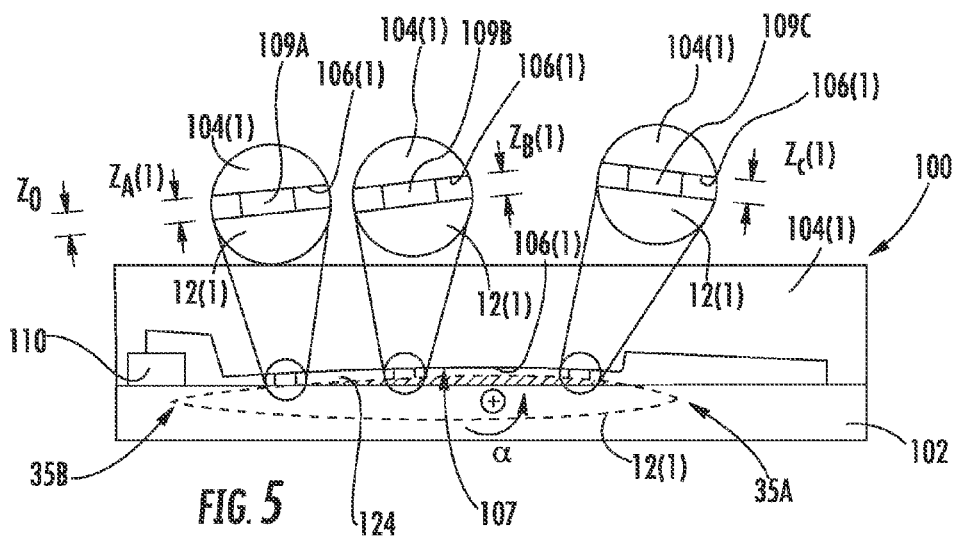
Figures 6A, 6B:
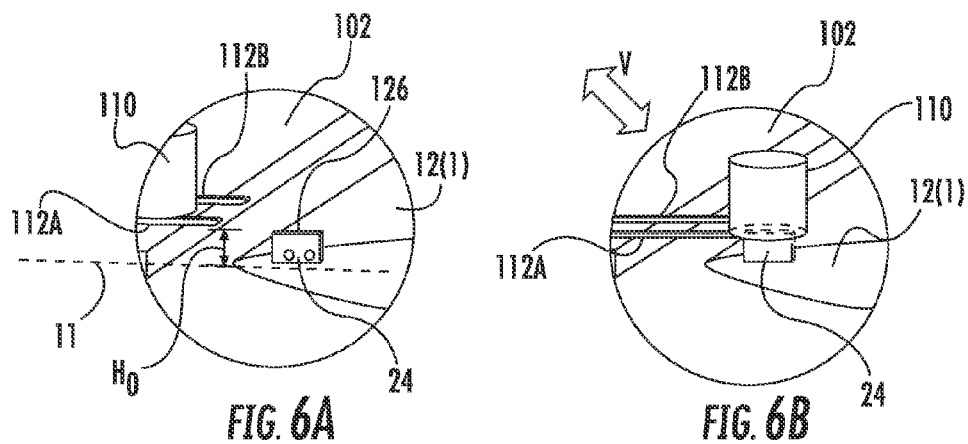
Figures 6C, 6D:
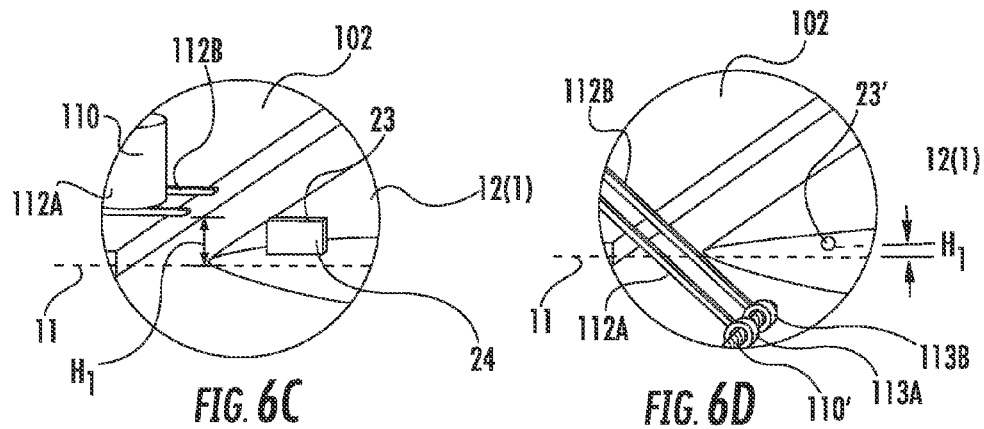
Figure 8:
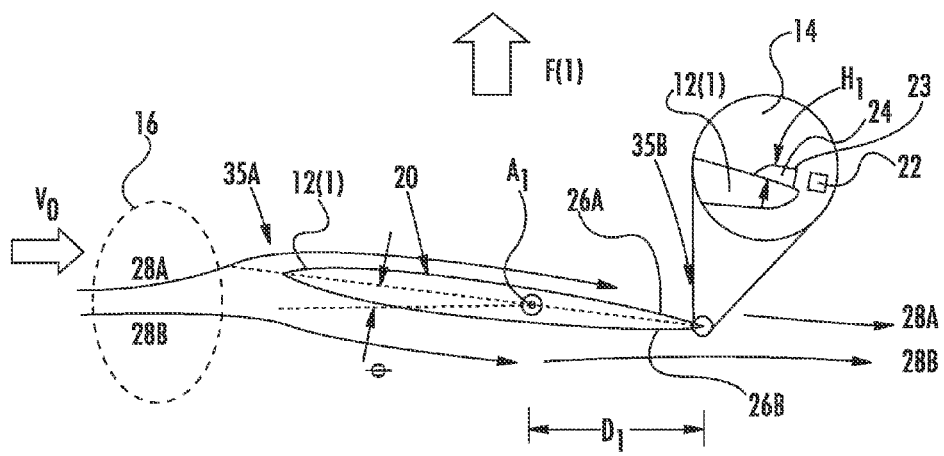
Figure 9:
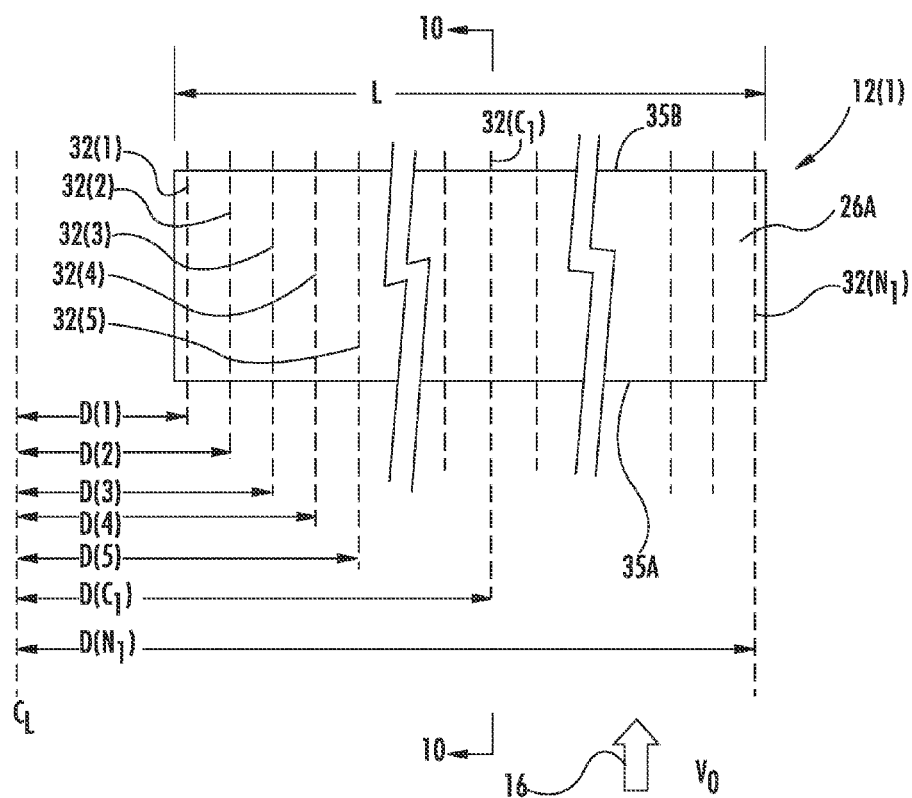
Figure 10:
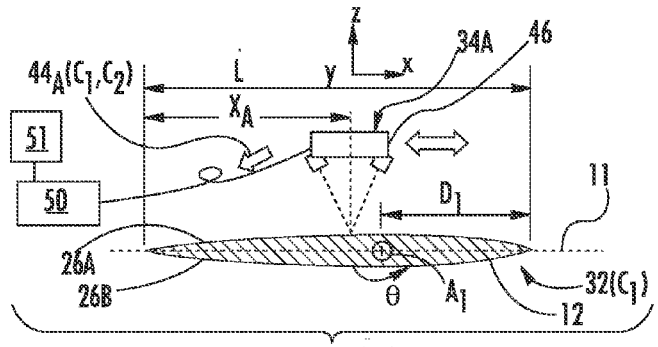
Figure 11:
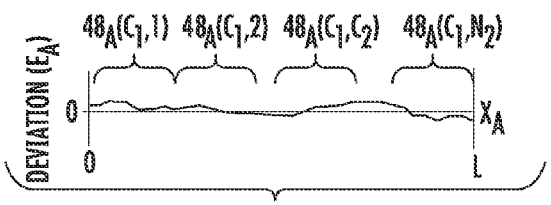
Figure 12:
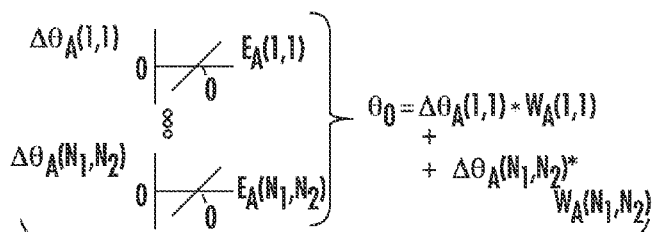
Figure 13:
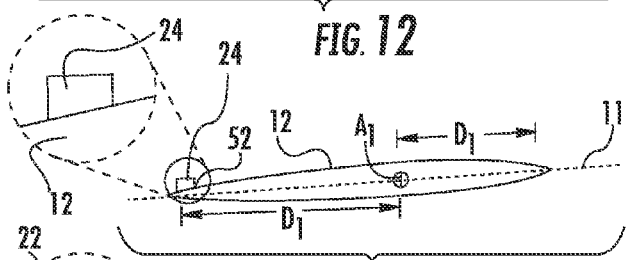
Figure 14:
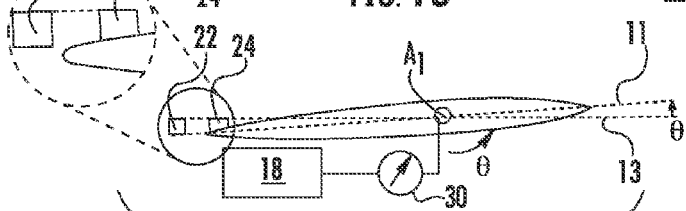
Figure 15:
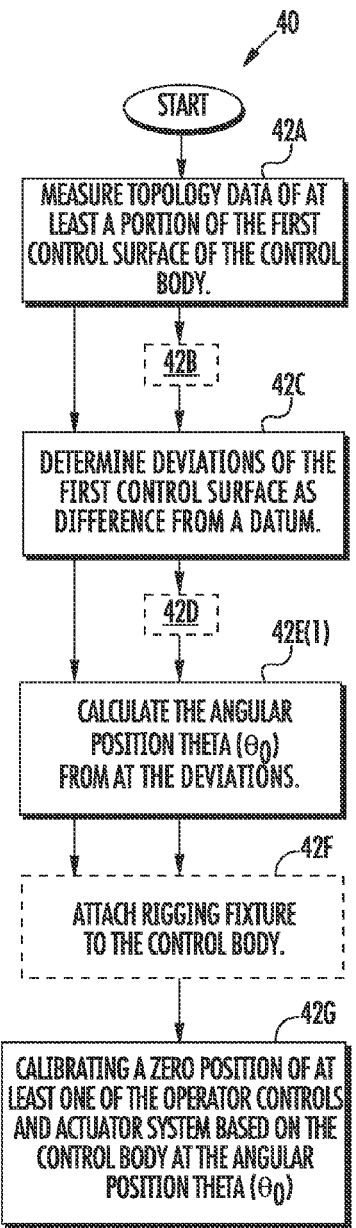
Figure 17:
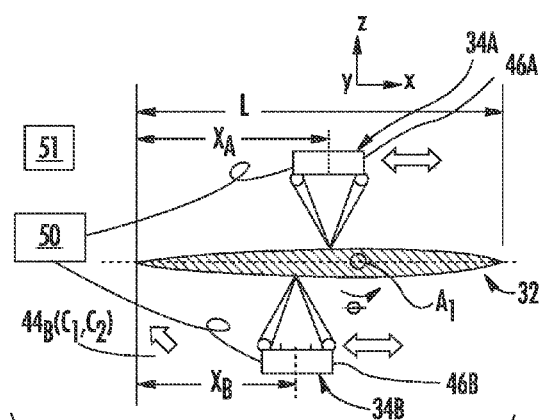
Figure 18:
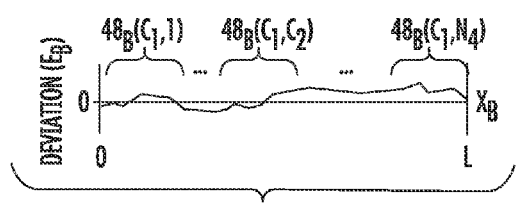
Figure 19:
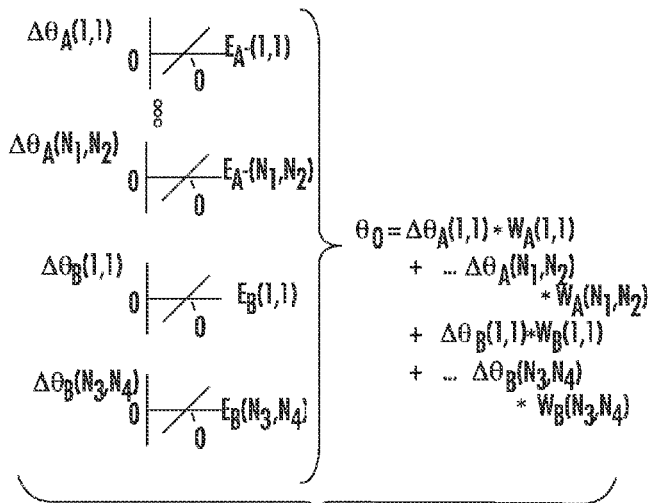
Figure 20:
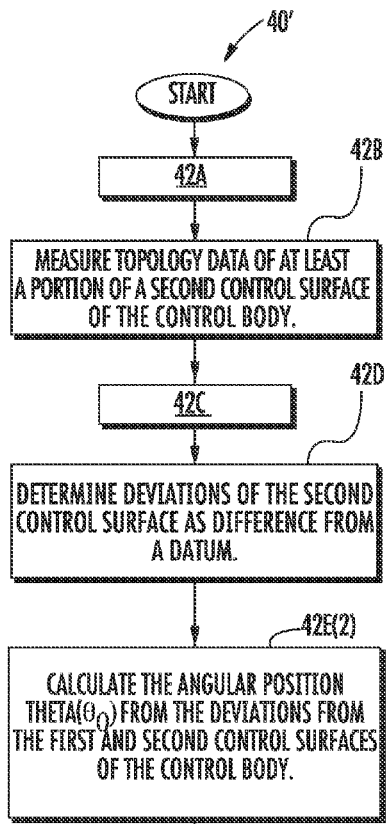

FIGS. 4 and 5 are a top perspective view and a front side view, respectively, of the control body of FIG. 3 and the metrology device being manipulated relative to each other to achieve a target relationship between a reference surface defined by the metrology device of FIG. 3 and the control surface of the control body, wherein FIG. 4 includes a close-up view of the material removal device, and FIG. 5 also includes close-up views of shim stock being installed to maintain the target relationship along the reference surface of the metrology device;

FIGS. 6A through 6C are close-up views of an exemplary rigging feature having an alignment surface being located and formed on the control body of FIG. 5 from a similar view as the close-up view of FIG. 4, wherein in FIG. 6A the rigging feature is attached to the control body, in FIG. 6B the material removal device forms the alignment surface of the rigging feature, and in FIG. 6C the material removal device is retracted to reveal a rigging feature with completed dimensions;

FIG. 6D is a close-up view of another example of an alignment feature in the form of a hole in the control body which may be aligned to a rigging point on the vehicle;

FIGS. 7A through 7D are a front side view, right side view, top view, and rear view, respectively, of the metrology device of FIG. 3;

FIG. 8 is a side view of the control body of FIG. 1B at the angular position theta with streamlines of the fluid passing across a first and second control surfaces of the control body to apply a net force to the control body;

FIG. 9 is a top view of the first control surface of the control body of FIG. 8 illustrating exemplary cross sections available for measurement of a shape of the at least one control surface of the control body;

FIG. 10 is a cross section of the control body of FIG. 9 with at least one metrology device measuring topological data of a portion of the first control surface along a cross section, and the at least one metrology device is in communication with a processor;

FIG. 11 is a graph of deviations of portions of the first control surface of FIG. 10 determined by the processor;

FIG. 12 is a schematic chart of relationships between the deviations of the first control surface and changes in the angular position theta of the control body associated with the design condition;

FIG. 13 is a cross section view of the control body of FIG. 10 with the rigging feature attached to the control body, the rigging feature including a dimension and attachment location consistent with the angular position theta of the control body associated with the design condition;

FIG. 14 is a cross section view of the control body of FIG. 13 with the rigging feature aligned with a rigging point, and the rigging point attached to the element of the vehicle as the operator controls are being adjusted to the zero position;

FIG. 15 is a flow chart of an exemplary process to rig the control surface of FIG. 1B utilizing deviations determined for the first control surface;

FIGS. 16A-16E are cross sectional views of various examples of control bodies including, respectively, a rotatable rudder (or diving plane, stabilator, or aerofoil), a plain flap, a split flap, a slotted flap, and a fowler flap;

FIG. 17 is a cross section of the control body of FIG. 9 with at least one metrology device measuring topological data of a portion of the first control surface and the second control surface along a cross section, and the at least one metrology device is in communication with the processor;

FIG. 18 is a graph of deviations of portions of the second control surface of FIG. 11 relative to a datum, and the deviations determined by the processor;

FIG. 19 is a schematic chart of relationships between the deviations for the first control surface and the second control surface and changes in the angular position theta of the control body associated with the design condition; and FIG. 20 is a flow chart of another embodiment of an exemplary process to rig the control surface of FIG. 1B utilizing deviations determined for the first control surface and the second control surface.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments includes herein include rigging methods to calibrate control bodies, and related systems. A rotatable control body may steer a vehicle. Deviations of the control body shape may distort a relationship between vehicle controls and the control body. Calibration restores the relationship by establishing an alignment surface as part of the control body which may be aligned to a rigging point on the vehicle associated with a known control setting. A metrology device and/or computer software may be used for calibration. The metrology device may define a positional relationship between a reference surface, a rotational axis, and a target location of the alignment surface. By manipulating a surface of the control body to a target relationship relative to the reference surface, the location of the alignment surface may be achieved relative to the control body. In this manner, a rigging feature with the alignment surface may be formed to improve vehicle performance.

Control bodies may be operated by operator controls, for example steering wheel, yoke, or flight instruments to direct the control surface to a determined angular position to create the steering forces appropriate for the path of the vehicle. A process called "rigging" ensures that the operator controls and/or the associated actuator system are calibrated or otherwise adjusted, so that when the operator controls are set at a design condition for the vehicle, then the control body is also positioned at a corresponding angular position to provide the expected vehicle performance at that design condition. In some cases, rigging does not produce expected performance characteristics at the zero point setting and at other operating points. Expensive and time-consuming adjustments are made to the operator controls based on vehicle performance testing to improve expected vehicle performance and stability. Embodiments are disclosed hereinafter provide efficient approaches to obtain expected vehicle performance.

In this regard, FIG. 1A is an axial view of a vehicle 10 including at least one control body 12(1), 12(2) and an element 14 traveling within a fluid 16 at a design condition. The design condition is associated with a set of characteristics for the fluid 16 including relative velocity $V_O$ of the fluid 16 relative to the vehicle 10, fluid temperature, fluid density and fluid pressure. In this design condition, the operator controls have been set to a predetermined "zero position" and a net force F(1) applied by the fluid 16 upon the control body 12(1) is substantially offset by a net force F(2) applied by the fluid 16 upon the control body 12(2). The offset provides stable and predictable operation of the vehicle 10 wherein the net torque $T_O$ applied by the net forces F(1), F(2) at a centerline $C_L$ of the vehicle 10 is zero or substantially zero. The fluid 16 may be, for example, at least one liquid, at least one gas, or combination of these. In this manner, the vehicle 10 may provide stable and predictable performance when operating at the design condition.

An operation of the vehicle 10 may depend on the type of the vehicle 10, and steering is provided by at least one of the control bodies 12(1), 12(2). In this regard, FIG. 1B is a top perspective view of the control body 12(1) of the vehicle 10 of FIG. 1A. The vehicle 10 may be, for example, an aircraft, a watercraft, or a combination of both with a propulsion system hidden from view to reduce complexity. It is noted that control body 12(2) may be optional and this is indicated by broken lines in FIG. 1A. The vehicle 10 may be steered by changing the angular position theta (θ) of the control body 12(1) which is an angle between a chord 11 of the control body 12(1) and a waterline 13 of the element 14. The control body 12(1) may be rotatable about an axis of rotation $A_1$ that may remain stationary with respect to at least a portion of the element 14. The control body 12(1), for example, may be a rudder, flight control surface body, or stabilator. The element 14 may be, for example, a fuselage, a wing, a vertical stabilizer, or a hull. The control body 12(1) may rotate about the axis of rotation $A_1$ to an angular positions theta (θ) as directed by the operator controls 18. The operator controls 18 may comprise, for example, a steering wheel, a navigational computer, control yoke, joystick, or pedals. The operator controls 18 may provide positional data to an actuator system 30 that provides torque $T_1$ to rotate the control body 12(1) to the angular positions theta (θ). The actuator system 30 may include, for example, mechanical linkages, cables, gears, electric servos, and/or hydraulic systems to provide the torque $T_1$.

As the control body 12(1) rotates to different values of the angular position theta (θ), the net force F(1) applied to the control body 12(1) may change as discussed below in more detail. There may be an angular position theta ($θ_O$) at the design condition where the net force F(1) applied to the control body 12(1) by the fluid 16 may be zero or will substantially offset the net force F(2) applied by the fluid 16 to the control body 12(2). At the design condition shown in FIGS. 1A and 1B, the net force F(1) of the fluid 16 applied to the control body 12(1) is precisely determined to be consistent with the angular position theta ($θ_O$) and a specific setting of the operator controls 18 called the "zero point." The angular position theta ($θ_O$) may be depicted as shown in FIG. 1B wherein a rigging point 22 of the element 14 is aligned with an alignment surface 23 of a rigging feature 24 attached to the control body 12(1). Dimensions and a location of the rigging feature 24 and/or the rigging point 22 are determined, so that when the rigging feature 24 and the rigging point 22 are aligned and the fluid 16 has the relative velocity $V_O$ and other associated design conditions (temperature, pressure, and/or density), the control body 12(1) is at the angular position theta ($θ_O$) consistent with the net torque $T_O$ applied to the centerline $C_L$ of the vehicle 10 from the at least one control body 12(1), 12(2) being zero or substantially zero.

Figure 1C:
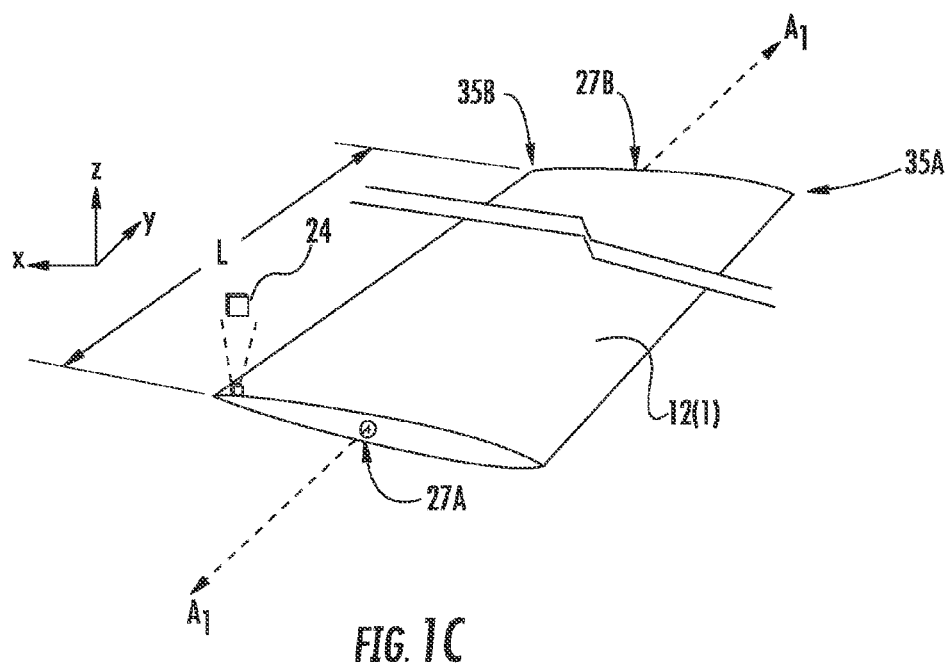
FIG. 1C is an exploded top perspective view of the control body of FIG. 1B from a root of the control body, and illustrating the rigging feature detached from the control body.

FIG. 1C is an exploded top perspective root view of the control body 12(1) of FIG. 1B separated from the element 14 of the vehicle 10 and depicting the rigging feature 24 detached from the control body 12(1). The rigging feature 24 may be a clip, fastener, or small object that is attached to the control body 12(1) with a weld, adhesive, cohesive, or a mechanical attachment device. The rigging feature 24 may be made of a strong resilient material, for example, metal, plastic, or composite material. In this manner, the rigging feature 24 may be positioned to indicate that the control body 12(1) is disposed at the angular position theta ($θ_O$) when aligned with the rigging point 22. The rigging feature 24 could also include some optical properties to make alignment more apparent, for example, reflecting material, brightly-colored paint, a light-emitting diode (LED), etc.

An external shape 20 of the control body 12(1) may include deviations resulting from, for example, manufacturing variances and changes during use. The deviations may change the net force F(1) to be inconsistent with a stable and predictable performance of the vehicle 10 when the control body 12(1) is subjected to the fluid 16 with the relative velocity $V_O$ and the other associated design conditions. In order to achieve stable and predictable performance with the vehicle 10 in this situation, the angular position theta (θ) of the control body 12(1) may be precisely adjusted so that the fluid 16 (having the relative velocity $V_O$ and other associated design conditions) applies the net force F(1) consistent with stable and predictable vehicle performance.

The angular position theta (θ) of the chord of the control body 12(1) relative to the waterline of the vehicle 10 may be adjusted by determining a location and dimension $H_1$ of the rigging feature 24 containing the alignment surface 23. The rigging feature 24 may be used for alignment to the rigging point 22 on the vehicle 10 during calibration of the operator controls 18. In this manner, changes in the location and the dimension $H_1$ of the rigging feature 24 may cause corresponding changes in the angular position theta (θ) of the control body 12(1). An exemplary metrology device 100 may be used to determine the dimension $H_1$ and/or the location of the alignment surface 23 of the rigging feature 24 of the control body so that the control body 12(1) may be at the target angular position theta (θ) when aligned with the rigging point 22 on the vehicle 10.

Figure 2:
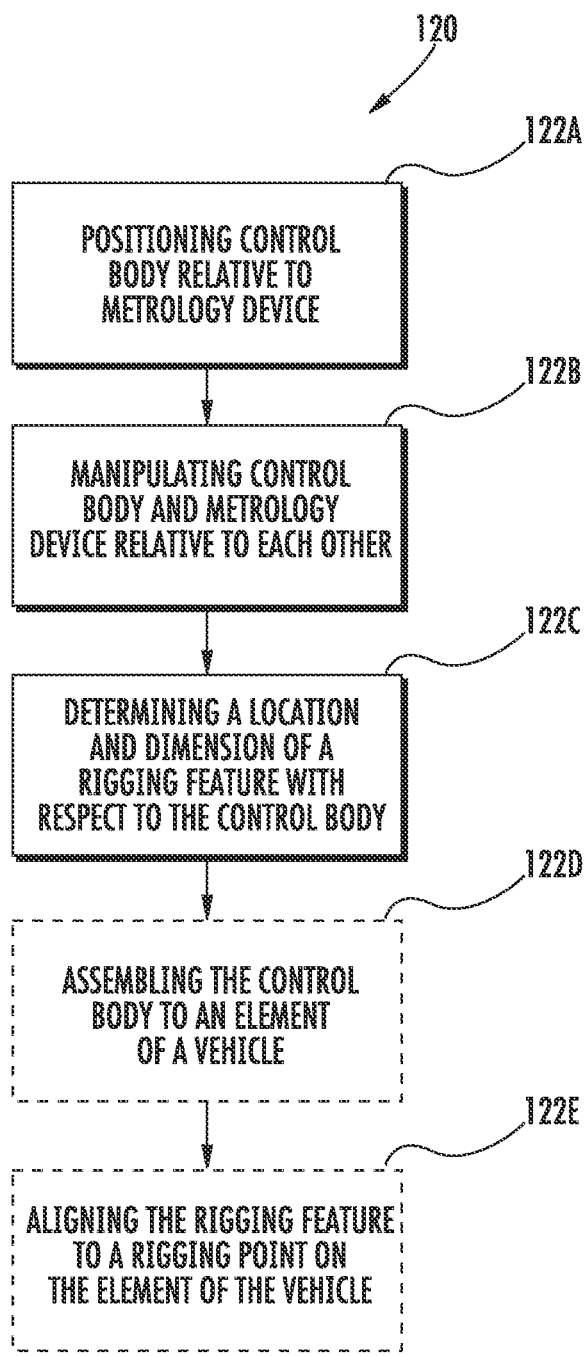
FIG. 2 is a flow chart of an exemplary process of rigging the control body of FIG. 1B by locating and aligning the rigging feature to the control body.

Now that fundamentals of the components of the vehicle 10, including the control body 12(1) have been discussed, FIGS. 3-7D will be discussed in the context of FIG. 2 depicting a flow chart of an exemplary method 120 for rigging the control body 12(1). The exemplary method 120 includes the operations 122A, 122B, and 122C which are discussed in detail below using the terminology discussed above. It is noted that operations 122D and 122E are optional and are thereby depicted in broken lines within FIG. 2.

In this regard, FIG. 3 is a top perspective view of the control surface 26A of the control body 12(1) of FIG. 1C being positioned into a facing relationship 101 with the metrology device 100 (operation 122A of FIG. 2). The facing relationship 101 prepares the control surface 26A to be manipulated relative to the metrology device 100 to determine a target relationship between the control body 12(1) and the metrology device 100. The metrology device 100 may include a reference structure 103 comprising a frame 102 and a plurality of contoured elements 104(1)-104($N_5$). The contour elements 104(1)-104($N_5$) may comprise a plurality of reference component surfaces 106(1)-106($N_5$). The reference surfaces 106(1)-106($N_5$) may collectively define a reference surface 107 which may be consistent with a nominal control surface of a control body 12 with target topological characteristics. The frame 102 may be attached to a first side 108A and a second side 108B of each of the contour elements 104(1)-104($N_5$) to define a positional relationship between the contour elements 104(1)-104($N_5$) to collectively define the reference surface 107 from the reference component surfaces 106(1)-106($N_5$). The reference surface 107 is a nominal surface of the control body 12(1) which may serve as a benchmark (or datum reference) upon which a location of the alignment surface 23 is determined.

The frame 102 may also include at least one spindle 114A, 114B to rotatably communicate with the at least one pivot point 27A, 27B of the control body 12(1). For example, the at least one spindle 114A, 114B may be disposed within the pivot points 27A, 27B of the control body 12(1) to restrict the control body 12(1) and the reference structure 103 to relative angular movement with respect to each other. The control surface 26A of the control body 12(1) may then be precisely manipulated with respect to the reference surface 107 of the metrology device 100 to obtain a target positional relationship between the control surface 26A and the reference surface 107 (operation 122B of FIG. 2). Upon achieving this target positional relationship, the location of the alignment surface 23 of the rigging feature 24 target to be formed on the control body 12(1) may be determined. In this manner, the alignment surface 23 may be used for calibration after the control body 12 is assembled as part of the vehicle 10.

A "best fit" approach during manipulation may be used to determine the target relationship, according to one embodiment. In this regard, FIGS. 4 and 5 are a top perspective view and a front side view, respectively, of the control surface 26A of the control body 12(1) of FIG. 3 and the reference surface 107 of the metrology device 100 being manipulated relative to each other to achieve the target positional relationship. Specifically, when the axis of rotation $A_1$ of the control body 12(1) and the axis $A_2$ of the metrology device 100 are aligned then a gap 124 may be created between the reference component surfaces 106(1)-106($N_5$) collectively defining the reference surface 107 and the control surface 26A of the control body 12(1). In the nominal case, with a distortion-free example of the control body 12(1), the thickness of the gap 124 may be a uniform thickness $Z_0$ from the leading edge 35A to the trailing edge 35B of the control body 12(1). The uniform thickness $Z_0$ may be, for example, in a range between an eighth (0.125) of an inch to a half (0.5) of an inch, and preferably a quarter (0.25) of an inch. Various thicknesses (represented by $Z_A(1)$, $Z_B(1)$, $Z_C(1)$ in FIG. 5) of the gap 124 along the width W and the length L of the control body 12(1) change as the control body 12(1) and the reference surface 107 are angularly manipulated with respect to each other to different angular positions alpha ($\alpha$). It is noted that the thicknesses of the gap 124 are only depicted in FIG. 5 relative to the reference component surface 106(1), but thicknesses of gaps 124 associated with the any combination of the reference component surfaces 106(1)-106($N_5$) may be used to achieve the target positional relationship between the control surface 26A and the reference surface 107 defined collectively by the reference component surfaces 106(1)-106($N_5$). In this regard, the best fit approach may include, for example, minimizing a variance of the thicknesses of the gap 124 at various thickness locations of the gap 124. It is noted that measurement of the thickness of the gap 124 may be accomplished, for example, with shim stock 109A, 109B, 109C or a measuring instrument such as a micrometer. In this manner, the target positional relationship may be achieved.

Once the target positional relationship is achieved, the target positional relationship may be maintained by securing the control body 12(1) relative to the reference structure 103. Several approaches to secure the target positional relationship are possible. For example, the shim stock 109A, 109B, 109C may be disposed in the gap 124 to prevent movement of the control body 12(1) relative to the reference surface 107. In this manner, the target positional relationship may be protected against disturbances which may change the positional relationship.

A location and dimension of the alignment surface 23 of the rigging feature 24 may be established with respect to the control body 12(1) once the target positional relationship is known (operation 122C of FIG. 2). In this regard, FIGS. 6A through 6C are close-up views of the rigging feature 24 having an alignment surface 23 being located and formed on the control body 12(1) of FIG. 5 from a similar view as the close-up view depicted in FIG. 4. In the exemplary approach depicted in FIGS. 6A through 6C, the rigging feature 24, for example, shim stock having a thickness of 0.06 inches, may be attached to be part of the control body 12(1). As depicted in FIG. 6A, the rigging feature 24 may be attached to the control body 12(1), for example, by applying a cohesive material, adhesive material, a weld, or integrally forming the material body 126 as part of the control body 12(1). The rigging feature 24 may have a pre-formed surface 128 which is a height $H_0$ from the chord 11 of the control body 12(1). The metrology device 100 may include a material removal device 110, for example a router, which may be precisely located relative to the reference structure 103. Rails 112A, 112B or other tool locators, may be used to precisely guide the material removal device 110 to the material body 126 to form the alignment surface 23 a height $H_1$ relative to the reference structure 103 as depicted in FIG. 6B. The material removal device 110 may be limited in movement by the rails 112A, 112B to form the alignment surface 23 at a specific location (or geometric plane) relative to the reference surface 107 consistent with a nominal example of the control body 12(1) with an alignment surface 23 in a datum or reference location. The rails 112A, 112B may also enable the material removal device 110 to disengage from the rigging feature 24 as shown in FIG. 6C. In this manner, the alignment surface 23 may be formed with respect to the control body 12(1) according to the target relationship between the control surface 26A and the reference structure 103.

It is noted that in other embodiments, instead of having the alignment surface 23 of the rigging feature 24 protruding from the control body 12(1), an alignment surface 23' may be utilized as depicted in FIG. 6D. The alignment surface 23' may define a hole formed in the control body 12(1) with a material removal device 110' such a bore or drill positioned by the rails 112A, 112B holding at least one drill bushing 113A, 113B, respectively. The rails 112A, 112B may be attached to the frame 102 to enable the hole to be located relative to the frame 102. In this manner, the alignment surface 23' may be disposed a distance $H_1$ from the chord 11 of the control body 12(1). In this alternative manner, the alignment surface 23' may be established for the control body 12(1) and the control body 12(1) calibrated for the vehicle 10 improve vehicle performance.

With reference back to FIG. 1B, once the alignment surface 23 has been established the control body 12(1) may be assembled to the element 14 of the vehicle 10 (operation 122D of FIG. 2) and aligned to the rigging point 22 of the vehicle 10 (operation 122E of FIG. 2). The operator controls 18 may be then be set to the zero point to correlate the zero point to the angular position theta ($\theta$) where the alignment surface 23 of the rigging feature 24 is aligned to the rigging point 22. In this manner, examples of the control body 12(1) having deviations in the control surface 26A may be calibrated to the operator controls 18 to improve vehicle performance by determining the alignment surface 23 based on the metrology device 100 defining a relationship between the rotation axis $A_2$, the reference surface 107, and a nominal location of the alignment surface 23.

FIGS. 7A through 7D are a front side view, right side view, top view, and rear view, respectively, of the metrology device 100 of FIG. 3. As shown in FIG. 7A the metrology device 100 may include the reference structure 103. The reference structure 103 may be made of a strong rigid material, for example, wood, plastic, metal, aluminum, and/or composite material. The reference structure 103 includes the plurality of contour elements 104(1)-104($N_5$) comprising the plurality of reference component surfaces 106(1)-106($N_5$). Each of the plurality of contour elements 104(1)-104($N_5$) includes the first side 108A and the second side 108B opposite the first side 108A. The reference structure 103 also includes the frame 102 attached to the first side 108A and the second side 108B of each of the plurality of contour elements 104(1)-104($N_5$). The frame 102 defines a positional relationship between the plurality of contour elements 104(1)-104($N_5$) to collectively define the reference surface 107 from the plurality of reference component surfaces 106(1)-106($N_5$). The reference surface 107 is associated with a nominal surface of a control body 12(1) to be used as a reference datum to create the alignment surface 23. In this regard, adjacent ones of the plurality of contour elements 104(1)-104($N_5$) may be separated by a distance $D_3$ (FIG. 7B) in a range from nine (9) inches to thirty (30) inches. The metrology device 100 also may include the material removal device 110 disposed with respect to the reference structure 103 and configured to dispose the alignment surface 23 of the rigging feature 24 of the control body 12(1) with respect to the reference structure 103. The material removal device 110 may, for example, comprise at least one of a router, a mill, a drill, and a laser. In this manner, the vehicle 10 with the control body 12(1) assembled thereto may perform more predictably to specification.

In order to achieve the target relationship between the control surface 26A of the control body 12(1) and the reference surface 107 of the metrology device 100 during manipulation, the control body 12(1) and the reference structure 103 may be restrained to angularly move about the same axis. In this regard, the reference structure 103 may further comprise at least one spindle 114A, 114B configured to allow relative rotation of the control body 12(1) with respect to the reference structure 103. In this manner, the control body 12(1) and the reference structure may be angularly moved with respect to each other until the target relationship is achieved.

In addition to the embodiments described above with respect to the method 120 (FIG. 2) and the metrology device 100 (FIG. 4) to establish the alignment surface 23 of the rigging feature 24 to the control body 12(1), the present disclosure contemplates a number of other embodiments to rig the control body 12(1). For example, if the needed performance of the control body 12(1) in terms of net force F(1) is known, then the changes to the positions of the alignment surface 23 may be computationally determined to compensate for distortions in the control surface 26A causing changes in the performance.

In this regard, FIG. 8 is a cross section of the control body 12(1) to illustrate the fluid 16 applying the net force F(1) to the control body 12(1). The external shape 20 of the control body 12(1) may include a first control surface 26A and a second control surface 26B opposite the first control surface 26A. When the fluid 16 flows across the control body 12, a first streamline 28A of the fluid 16 may flow along the first control surface 26A and a second streamline 28B of the fluid 16 may flow along the second control surface 26B. A shape of the first control surface 26A may determine a trajectory of the first streamline 28A and the shape of the second control surface 26B may determine a trajectory of the second streamline 28B. The angular position theta (θ) of the control body 12(1) also changes the trajectory of the first streamline 28A relative to the second streamline 28B. Differences in the trajectories of the streamlines 28A, 28B may cause the fluid 16 to travel at different local speeds through the trajectories of the streamlines 28A, 28B while under the influence of drag and viscosity according to relationships conserving mass, momentum, and energy of the fluid 16. Computational fluid dynamics relationships, for example, Euler equations and Navier-Stokes equations may be used to calculate the local velocity and thereby the pressure along the external shape 20 of the control body 12(1); this pressure can then be integrated to determine the net force F(1) applied on the control body 12(1) from the fluid 16. Alternatively, look-up tables may summarize empirical data or calculated results for the net force F(1) at different angular positions theta (θ) for various deviations in the control surfaces 26A, and/or second control surface 26B. Using one or more of these exemplary approaches the net force F(1) may be calculated to provide stable and predictable vehicle performance at the design condition with the angular position theta ($θ_O$).

As part of these exemplary approaches, contributions to the net force F(1) at different ones of the cross sections 32(1)-32($N_1$) may be integrated to determine the net force F(1). In this regard, FIG. 9 is a top view of a first control surface 26A of the control body 12(1) of FIG. 1B illustrating exemplary cross sections 32(1)-32($N_1$) for calculation of the contribution to the net force F(1) by measuring topological data of at least one of the control surfaces 26A, 26B at the cross sections 32(1)-32($N_1$). Adjacent ones of the cross sections 32(1)-32($N_1$) may be spaced apart by a distance in a range from ten (10) millimeters to thirty (30) millimeters. The cross sections 32(1)-32($N_1$) may be associated with distances D(1)-D($N_1$) from the centerline $C_L$ of the vehicle 10 to the cross sections 32(1)-32($N_1$). Accordingly, upon determining the contributions of the control body 12(1) to the net force F(1) at the cross sections 32(1)-32($N_1$), the contributions of each of the cross sections 32(1)-32($N_1$) to the torque $T_O$ at the centerline $C_L$ of the vehicle 10 may be determined as the product of the contribution to the net force F(1) at the cross section 32(1)-32($N_1$) and the respective one of the distances D(1)-D($N_1$) from the centerline $C_L$ of the vehicle. 10. In this manner, deviations of the external shape 20 of at least one of the control surface 26A, 26B of the control body 12(1) relative to the stability and predictable performance of the control body 12(1) at the design condition may be determined and compensated for by determining the angular position theta ($θ_O$) for the control body 12(1).

Some portions of the control body 12(1) may have more significance to other portions of the control body 12(1) in determining net torque $T_O$. For example, portions of the control body 12(1) further away from the centerline $C_L$ (see FIG. 1A) of the vehicle 10 may have a larger moment arm represented by distance D($N_1$) in FIG. 9 to contribute to the torque $T_O$. Accordingly, the cross sections 32(1)-32($N_1$) may be unequally distributed along the control body 12, although an exemplary equal distribution of the cross sections 32(1)-32($N_1$) is depicted in FIG. 9. Also, the second control surface 26B may be shaped in a manner where deviations have a relatively low impact on the net force F(1) and measurement may not be necessary, for example when the second control surface 26B serves as a "pressure side" of an airfoil and the first control surface 26A serves as a "suction side" of an airfoil. By allocating calculation resources accordingly, calculation efficiency is improved as resources may be directed to the more relevant portions of the control body 12(1) to determine the consequences of deviations of the external shape 20 of the control body 12(1) to the design condition.

Further, the cross sections 32(1)-32($N_1$) are depicted in FIG. 9 as being parallel to the relative velocity $V_0$ of the fluid 16 relative to the vehicle 10. However, it is further disclosed herein that these cross sections 32(1)-32($N_1$), including the cross section 32($C_1$), may be angled to be aligned with local streamline directions to reflect the local direction of the fluid 16 across the control body 12. The local direction may be determined empirically or numerically using computational fluid dynamic approaches. In this way, additional accuracy may be obtained when determining the contribution to the net force F(1) applied by the fluid 16 at the cross sections 32(1)-32($N_1$).

Now that the components of the vehicle 10 and exemplary approaches to determining a net force F(1) applied to the at least one control body 12(1), 12(2) from the fluid 16 at the design condition have been discussed, FIGS. 10-14 will be discussed in the context of FIG. 15 depicting a flow chart of an exemplary method 40 for rigging the at least one control body 12. The exemplary method 40 includes the operations 42A, 42C, 42E(1), 42F, and 42G and is discussed in detail below using the terminology discussed above. It is noted that FIGS. 10-14 may specifically correspond to operations 42A, 42C, 42E(1), 42F, and 42G, respectively. It is noted that operations 42B and 42D are depicted in broken line within FIG. 15 only as placeholders and will be discussed in detail with respect to FIG. 20.

In this regard, FIG. 10 is a side view of a cross section 32($C_1$) of the control body in FIG. 9 with at least one metrology device 34A measuring topographical data 44$_A$ ($C_1, C_2$) of at least a portion 48A($C_1, C_2$) of the at least one control surface 26A along at least one of the cross sections 32(1)-32($N_1$) (operation 42A of FIG. 15). The metrology device 34A may move in the x-direction and/or the y-direction. The topographical data 44$_A$($C_1, C_2$) may, for example, include average z-direction measurements respectively at the portion 48A($C_1, C_2$). In this manner, the topographical data 44$_A$($C_1, C_2$) may be collected for the portion 48A($C_1, C_2$) to be available for comparison against a datum (or reference values) and used for determining rigging adjustments as discussed below.

It is noted that the control surface 26A may comprise the portions 48A(1, 1)-48A($C_1, C_2$) associated with the cross sections 32(1)-32($N_1$) and with the topographical data 44$_A$(1, 1)-44$_A$($N_1$, $N_2$) of the first control surface 26A. A subset or all of the portions 48A(1, 1)-48A($N_1$, $N_2$) may be selected for measurement by the metrology device 34A to calculate relevant ones of the topographical data 44$_A$(1, 1)-44$_A$($N_1$, $N_2$). For example, the portion of the first control surface 26A measured may be in a range from five (5) percent to twenty (20) percent of the control surface 26A, but preferably the full control surface 26A is measured. Also, for example, some versions of the vehicle 10 the portion measured may extend from a trailing edge 35B of the control body 12(1) to a range from two (2) inches to twenty (20) inches from the trailing edge 35B of the control body 12(1). Alternative portions to be measured may be based on the leading edge 35A of the control body 12(1). Whether all or subset of the portions 48A(1, 1)-48A($N_1$, $N_2$) are selected for measurement may be determined based on, for example, a relative impact of the portion on the net force F(1) at the design condition and may be selected on a case-by-case basis based, for example, on the vehicle 10 and the design condition.

The at least one metrology device 34A in one embodiment, for example, may be a V-Stars photogrammetry data collection device 46 manufactured by Geodetic Systems of Melbourne, Fla. In another embodiment the at least one metrology device 34A may be a Metrascan-R manufactured by Geotetic Systems of Quebec, Canada. In this manner, the z-direction measurements may be collected within a sub-millimeter tolerance.

As depicted in FIG. 11, the method 40 may also include determining with a processor 50 a deviation $E_A(1, 1)$-$E_A(N_1, N_2)$ between the at least the portion of the topographical data 44$_A$(1, 1)-44$_A$($N_1$, $N_2$) and a datum (operation 42C of FIG. 15). The deviation $E_A(1, 1)$-$E_A(N_1, N_2)$ may be determined as a difference between the at least the portion of the topographical data 44$_A$(1, 1)-44$_A$($N_1$, $N_2$) and the datum. The datum may be, for example, nominal design coordinates for the portions 48A(1, 1)-48A($N_1$, $N_2$) or measurements determined from portions 48A(1, 1)-48A($N_1$, $N_2$) of another example of a control body 12(1) having a control surface 26A. Information regarding the datum may be stored in a non-transitory medium of a storage device 51 which is accessible from the processor 50. In this manner, the deviation $E_A(1, 1)$-$E_A(N_1, N_2)$ may be determined.

As depicted in FIG. 12, the method 40 may also include determining the angular position theta ($\theta_0$) to produce the net force F(1) at the design condition (operation 42E(1) at FIG. 15). In one embodiment shown in FIG. 12, each of the deviations $E_A(1, 1)$-$E_A(N_1, N_2)$ may be associated with a corresponding change $\Delta\theta A(1, 1)$-$\Delta\theta A(N_1, N_2)$ in the angular position theta ($\theta$) of the control body 12(1) as determined by empirical or numerical analysis means. For example, the numerical analysis means may include computational fluid dynamic models of the control surface 26A at various angular positions ($\theta$). The angular position theta ($\theta_0$) at the design condition to create the net force F(1) may calculated based on a relationship of:

$$\theta_0 = \Delta\theta_A(1,1)*W_A(1,1) + \Delta\theta_A(1,2)*W_A(1,2) + \ldots + \Delta\theta_A(N_1,N_2)*W_A(N_1,N_2),$$

wherein:

$\Delta\theta_A(1, 1)$-$\Delta\theta_A(N_1, N_2)$ are changes in the angular position theta ($\theta$) as a function of the deviation $E_A(1, 1)$-$E_A(N1, N2)$ at respective ones of the portions 48A(1, 1)-48A($N_1$, $N_2$) of the control surface 26A; and $W_A(1, 1)$-$W_A(N_1, N_2)$ are the relative weights of the portions 48A(1, 1)-48A($N_1$, $N_2$) of the control surface 26A to the angular position theta ($\theta$) of the control surface 26A.

Accordingly, when the angular position theta ($\theta_0$) may be determined, then the rigging feature 24 may then be attached to the control body 12(1) consistent with the angular position theta ($\theta_0$). As depicted in FIG. 13, the method 40 may also include attaching the rigging feature 24 to the control body 12(1) (operation 42F of FIG. 15). In this regard, the rigging feature 24 with precise dimensions (i.e., dimension $H_1$ defining a location of the alignment surface 23 to the chord 11 of the control body 12) may be attached to the control body 12(1) at a position 52 located a distance $D_1$ from the axis of rotation $A_1$, so that the rigging feature 24 may be aligned to the rigging point 22 on the element 14 when the control body 12(1) is disposed at the angular position theta ($\theta_0$) associated with the design condition. The precise dimensions of the rigging feature 24 may also be determined to ensure alignment and the dimensions may be unique to respective values of the angular position theta ($\theta_0$). For example, a reference surface of the rigging feature 24 may be disposed at a position to align with the rigging point 22 when the control body 12(1) is in the angular position theta ($\theta_0$). In this manner, the control body 12(1) is disposed at the angular position theta ($\theta_0$) associated with the net force F(1) at the design condition when the rigging feature 24 is aligned with the rigging point 22.

As depicted in FIG. 14, the method 40 may also include calibrating a "zero position" of at least one of the actuator system 30 and/or operator controls 18 to the control body 12(1) at the angular position theta ($\theta_0$) (operation 42G of FIG. 15). In the case where the rigging feature 24 is attached to the control body 12(1), then the rigging feature 24 is aligned to the rigging point 22 when the operator controls 18 are set to the zero point. The zero point may be a specific position or reading of the operator controls 18. The alignment between the rigging point 22 and the rigging feature 24 may provide an opportunity for personnel to work with the operator of the vehicle to visually inspect the control body 12(1) to ensure the control body 12(1) is rigged to the operator controls 18. In this manner, when the operator controls 18 are set to the zero point, then the control body 12(1) may be positioned to the angular position theta ($\theta_0$) and when the vehicle 10 is traveling at the design condition, then the fluid 16 may apply the net force F(1) to the control body 12(1) to provide predictable performance when the alignment surface 23 is aligned with the rigging point 22.

It is noted that in the case when the control body 12(1) can be aligned to the rigging point 22 without the rigging feature 24, then attaching the rigging feature 24 to the control body 12(1) may be optional and the control body 12(1) may be directly aligned with the rigging point 22.

Figure 16:
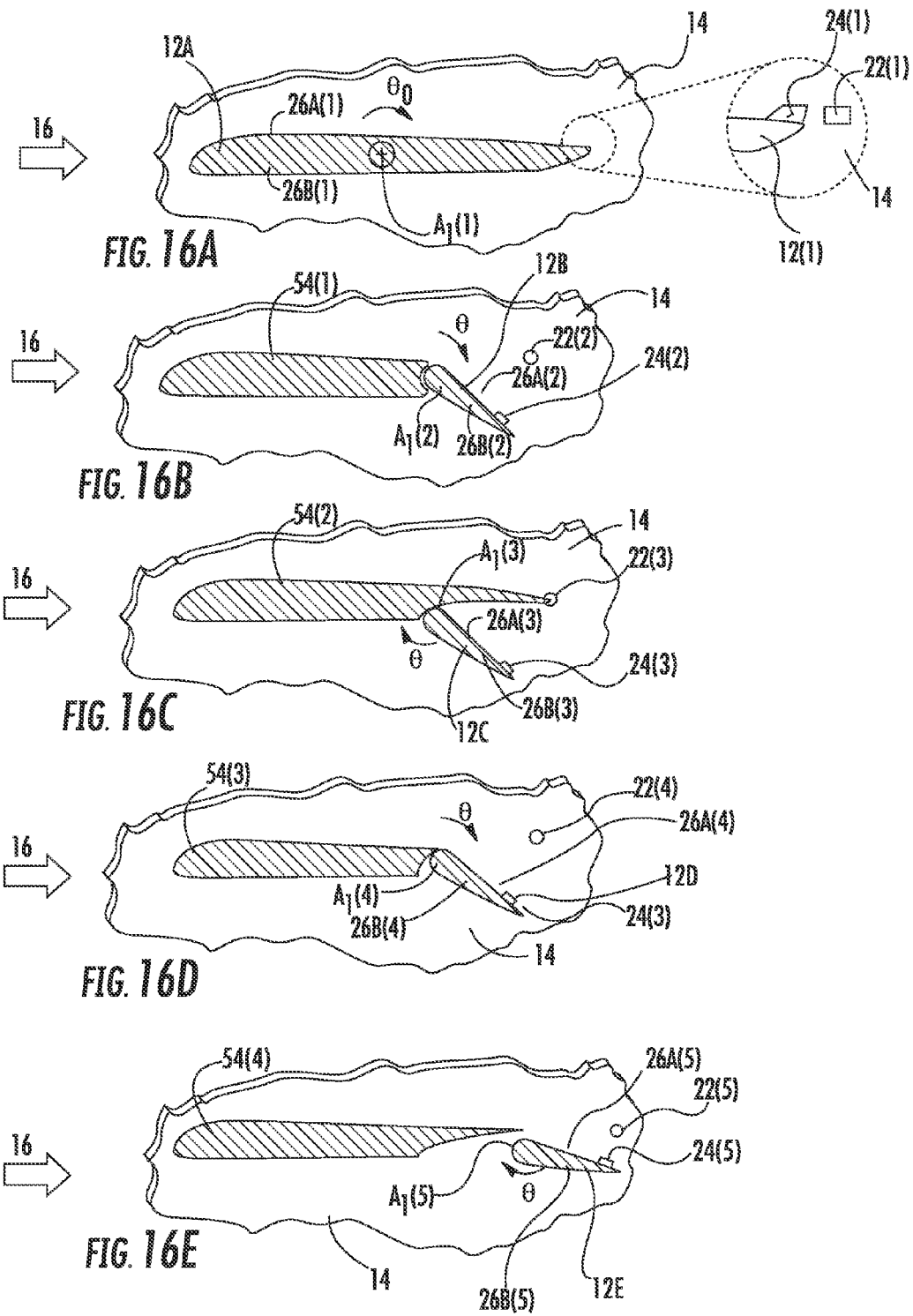

There are many different examples of the control body 12(1) that may be rigged using the methods 40 and 120. In this regard, FIGS. 16A-16E are cross sectional views of control bodies 12A-12E in rotatable communication with the element 14. The control bodies 12A-12E are different examples of the control body 12(1) shown in FIG. 1B, respectively. In this regard, FIG. 16A depicts the control body 12A having a first control surface 26A(1) and a second control surface 26B(1) having a same shape as the first control surface 26A(1). The control body 12A may serve with some shape modification, for example, as a rudder, diving plane, stabilator, or aerofoil. The control body 12A may be rotatable about an axis of rotation $A_1(1)$ to an angular position theta ($\theta_0$) at a design condition as may be determined in the methods 40 and 120. When in the angular position theta ($\theta_0$), the rigging point 22(1) is aligned with the rigging feature 24(1). In this manner, the control body 12A provides stable and predictable performance at the design condition.

FIG. 16B depicts the control body 12B having a first control surface 26A(2) and a second control surface 26B(2) following a leading guide element 54(1). The leading guide element 54(1) may be stationary with respect to the element 14. The control body 12B and the leading guiding element 54(1) may be in a plain flap arrangement. The control body 12B may be rotatable about an axis of rotation $A_1(2)$ to an angular position theta ($\theta_0$) at a design condition as may be determined in the methods 40 and 120. When in the angular position theta ($\theta_0$), the rigging point 22(2) is configured to be aligned with the rigging feature 24(2). In this manner, the control body 12B provides stable and predictable performance at the design condition.

FIG. 16C depicts the control body 12C having a first control surface 26A(3) and a second control surface 26B(3) following a leading guide element 54(2). The leading guide element 54(2) may be stationary with respect to the element 14. The control body 12C and the leading guiding element 54(2) may be in a split flap arrangement. The control body 12C may be rotatable about an axis of rotation $A_1(3)$ to an angular position theta ($\theta_0$) at a design condition as may be determined in the methods 40 and 120. When in the angular position theta ($\theta_0$), the rigging point 22(3) is aligned with the rigging feature 24(3). In this manner, the control body 12C provides stable and predictable performance at the design condition.

FIG. 16D depicts the control body 12D having a first control surface 26A(4) and a second control surface 26B(4) following a leading guide element 54(3). The leading guide element 54(3) may be stationary with respect to the element 14. The control body 12D and the leading guiding element 54(3) may be in a slotted flap arrangement. The control body 12D may be rotatable about an axis of rotation $A_1(4)$ to an angular position theta ($\theta_0$) at a design condition as may be determined in the methods 40 and 120. When in the angular position theta ($\theta_0$), the rigging point 22(4) is aligned with the rigging feature 24(4). In this manner, the control body 12D provides stable and predictable performance at the design condition.

FIG. 16E depicts the control body 12E having a first control surface 26A(5) and a second control surface 26B(5) following a leading guide element 54(4). The leading guide element 54(4) may be stationary with respect to the element 14. The control body 12E and the leading guiding element 54(4) may be in a fowler flap arrangement. The control body 12E may be rotatable about an axis of rotation $A_1(5)$ to an angular position theta ($\theta_0$) at a design condition as may be determined in the methods 40 and 120. When in the angular position theta ($\theta_0$), the rigging point 22(5) is aligned with the rigging feature 24(5). In this manner, the control body 12E provides stable and predictable performance at the design condition.

The method 40 of rigging a control body 12(1) has been discussed as well as examples of the control bodies 12A-12E. The method 40 may be modified to measure the first control surface 26A and the second control surface 26B of the control body 12(1) when rigging the control body 12(1). In this regard, FIGS. 17-19 may be discussed in respect to FIG. 20, which is a flowchart representing a method 40' of rigging the control body 12. The terminology introduced above will be used below for clarity and conciseness. For example, operations 42A, 42C, 42F, and 42G may be the same as depicted in FIG. 15 an the details of which will not be re-introduced to instead focus on the different aspects of the method 40'.

FIG. 17 is a side view of the cross section $32(C_1)$ of the control body 12(1) of FIG. 9. The control body 12(1) includes the control surface 26A being measured by the metrology device 34A and the second control surface 26B being measured by the metrology device 34B. The metrology devices 34A, 34B are in communication with the processor 50.

In this regard, FIG. 17 is a side view of a cross section $32(C_1)$ of the control body in FIG. 9 with at least one metrology device 34B measuring topographical data $44_B(C_1, C_2)$ of at least a portion $48B(C_1, C_2)$ respectively of the second control surface 26B along the cross section $32(C_1)$ (operation 42B of FIG. 20). The metrology device 34B may move in the x-direction and/or the y-direction. The topographical data $44_B(C_1, C_2)$ may, for example, include average z-direction measurements respectively at the portion $48B(C_1, C_2)$. In this manner, the topographical data $44B(C_1, C_2)$ may be collected for the portion $48B(C_1, C_2)$ to be available for comparison against a datum and used for determining rigging adjustments as discussed below.

It is noted that the control surface 26B may comprise the portions 48B(1, 1)-48B($C_1$, $N_4$) associated with the cross sections 32(1)-32($N_1$) and with the topographical data 44B (1, 1)-44B($N_3$, $N_4$) of the second control surface 26B. A subset or all of the portions 48B(1, 1)-48B($N_3$, $N_4$) may be selected for measurement by the metrology device 34A to calculate relevant ones of the topographical data 44B(1, 1)-44B($N_3$, $N_4$). Whether all or subset of the portions 48B(1, 1)-48B($N_3$, $N_4$) are selected for measurement may be determined based on, for example, a relative impact of the portion on the net force F(1) at the design condition.

The at least one metrology device 34B in one embodiment, for example, may be a V-Stars photogrammetry data collection device 46 manufactured by Geodetic Systems of Melbourne, Fla. In another embodiment the at least one metrology device 34B may be a Metrascan-R manufactured by Geotetic Systems of Quebec, Canada. In this manner, the z-direction measurements may be collected within a sub-millimeter tolerance.

As depicted in FIG. 18, the method 40' may also include determining with a processor 50 a deviation $E_B(1, 1)$-$E_B(N_3, N_4)$ between the at least the portion of the topographical data 44B(1, 1)-44B($N_3$, $N_4$) and a datum (operation 42E(2) of FIG. 20). The deviation $E_B(1, 1)$-$E_B(N_3, N_4)$ may be determined as a difference between the at least the portion of the topographical data $44_B(1, 1)$-$44_B(N_3, N_4)$ and the datum. The datum may be, for example, nominal design coordinates for the portions 48B(1, 1)-48B($N_3$, $N_4$) or measurements determined from portions 48B(1, 1)-48B($N_3$, $N_4$) of another example of a control body 12(1) having a control surface 26B. Information regarding the datum may be stored in the non-transitory medium of the storage device 51 which is accessible from the processor 50. In this manner, the deviation $E_B(1, 1)$-$E_B(N_3, N_4)$ may be determined and used to calculate the angular position theta ($\theta$) associated with the design condition.

As depicted in FIG. 19, the method 40' may also include determining the angular position theta ($\theta_0$) to produce the net force F(1) at the design condition (operation 42C' at FIG. 20). In one embodiment show in FIG. 19, each of the deviations $E_A(1, 1)$-$E_A(N_1, N_2)$, $E_B(1, 1)$-$E_B(N_3, N_4)$ may be associated with a corresponding change in the angular position theta ($\theta$) of the control body 12(1) as determined by empirical or numerical analysis means. For example, the numerical analysis means may include computational fluid dynamic models of the control surfaces 26A, 26B at various angular positions ($\theta_0$). The angular position theta ($\theta$) at the design condition to create the net force F(1) may calculated based on a relationship of:

$$\theta_0 = \Delta\theta_A(1,1)*W_A(1,1) + \Delta\theta_A(1,2)*W_A(1,2) + \ldots + \Delta\theta_A(N_1,N_2)*W_A(N_1,N_2) + \Delta\theta_B(1,1)*W_B(1,1) + \Delta\theta_B(1,2)*W_B(1,2) + \ldots + \Delta\theta_B(N_3,N_4)*W_B(N_3,N_4),$$

wherein:

$\Delta\theta_A(1, 1)$-$\Delta\theta_A(N_1, N_2)$ are changes in the angular position theta ($\theta$) as a function of the deviation $E_A(1, 1)$-$E_A(N_1, N_2)$ at respective ones of the portions 48A(1, 1)-48A($N_1$, $N_2$) of the control surface 26A;

$\Delta\theta_B(1, 1)$-$\Delta\theta_B(N_3, N_4)$ are changes in the angular position theta ($\theta$) as a function of the deviation $E_B(1, 1)$-$E_B(N_3, N_4)$ at respective ones of the portions 48B(1, 1)-48B($N_3$, $N_4$) of the control surface 26B;

$W_A(1, 1)$-$W_A(N_1, N_2)$ are the relative weights of the portions 48A(1, 1)-48A($N_1$, $N_2$) of the control surface 26A to the angular position theta ($\theta$) of the control surface 48A; and $W_B(1, 1)$-$W_B(N_3, N_4)$ are the relative weights of the portions 48B(1, 1)-48B($N_3$, $N_4$) of the control surface 26B to the angular position theta ($\theta$) of the control surface 26B.

Accordingly, when the angular position theta ($\theta_0$) may be determined, using the operation 42E(2) in FIG. 20, then the method 40' may continue with operations 42F, 42G as discussed above. In this manner, the control body 12(1) may be rigged so that there is stability and control of the vehicle 10 at the design condition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    positioning a control surface of a control body of a vehicle into a facing relationship with a reference surface defined by a metrology device, wherein positioning the control body comprises rotatably mounting the control body on at least one spindle of the metrology device at a pivot point of the control body;
    manipulating the control body and the metrology device relative to each other until a target relationship is achieved between the reference surface and a control surface of the control body; and
    determining a location for a rigging feature on the control body while maintaining the target relationship.

2. The method of claim 1, wherein the reference surface defines a nominal control surface.

3. The method of claim 1, wherein determining the location of the rigging feature on the control surface comprises aligning the rigging feature with a reference point external to the control body.

4. The method of claim 1, wherein the reference surface of the metrology device is collectively defined by respective reference surfaces of a plurality of contour elements.

5. The method of claim 1, further comprising forming the rigging feature on the control body at the determined location.

6. The method of claim 5, wherein the forming the rigging feature comprises removing material from the control body to create an alignment surface with a material removal tool located in a predetermined location with respect to the metrology device.

7. The method of claim 1, further comprising rotatably attaching the control body to a vehicle at a pivot point of the control body.

8. The method of claim 7, further comprising calibrating to a zero point of operator controls that are operably connected to the control body by rotating the control body at the pivot point to align the rigging feature with a rigging point on the vehicle.

9. The method of claim 1, wherein the positioning further includes establishing a gap between the control surface of the control body and the reference surface of the metrology device, wherein an average width of the gap is in a range from an eighth (0.125) of an inch to a half (0.5) inch.

10. The method of claim 9, wherein the manipulating further comprises achieving the target relationship upon minimizing a variance of the a of the gap between the reference surface and the control body.

11. A method, comprising:
    positioning a control surface of a control body of a vehicle into a facing relationship with a reference surface defined by a metrology device;

manipulating the control body and the metrology device relative to each other until a target relationship is achieved between the reference surface and a control surface of the control body, wherein the manipulating further comprises changing an angular position of the control body about a pivot point of the control body and with respect to the reference surface of the metrology device until the target relationship is achieved; and determining a location for a rigging feature on the control body while maintaining the target relationship.

12. A metrology device, comprising:

a reference structure comprising:

a plurality of contour elements comprising a plurality of reference component surfaces, wherein each of the plurality of contour elements includes a first side and a second side opposite the first side; and a frame attached to the first side and the second side of each of the plurality of contour elements and the frame defines a positional relationship between the plurality of contour elements to collectively define a reference surface from the plurality of reference component surfaces, wherein the reference surface is associated with a nominal surface of a control body; and at least one tool locator attached to the frame, defining a reference to position a rigging feature with respect to the control body.

13. The metrology device of claim 12, wherein adjacent ones of the plurality of contour elements are separated by a distance in a range from nine (9) inches to thirty (30) inches.

14. The metrology device of claim 12, wherein the reference structure further comprises at least one spindle configured to allow relative rotation of the control body with respect to the frame.

15. The metrology device of claim 14, further comprising a material removal device, and wherein the material removal device comprises at least one of a router, a mill, a drill, and a laser.

16. A computer program product for rigging a control body, the computer program product comprising:

a computer-readable storage medium having computer-readable program code embodied therewith, the computer-readable program code comprising:

computer-readable program code configured to measure, by instructing at least one metrology device, topology data of a control surface of the control body relative to a pivot point of the control surface;

computer-readable program code configured to determine deviations of the control surface measured with respect to a reference surface;

computer-readable program code configured to calculate an angular position of the control body relative to a pivot point of the control body which minimizes a variance of the deviations; and computer-readable program code configured to calculate at least one of a dimension of a rigging feature and an attachment location of the rigging feature with respect to the control body, so that an alignment surface of the rigging feature is aligned to a predetermined location of a rigging point on a vehicle upon rotatable assembly of the control body to the vehicle.

17. The computer program product of claim 16, further comprising computer-readable program code configured to instruct a photogrammetry device to measure the topology data.

18. The computer program product of claim 16, further comprising computer-readable program code to calculate the angular position of the control body to minimize a net torque applied to the vehicle collectively by a fluid to the control body and a second control body of the vehicle.

19. The computer program product of claim 16, further comprising computer-readable program code to initiate removal of material to form the alignment surface of the rigging feature.

* * * * *